United States Patent
Seadat Beheshti et al.

(10) Patent No.: US 12,320,987 B2
(45) Date of Patent: Jun. 3, 2025

(54) ELECTRONIC DEVICES WITH OPTICAL ASSEMBLY POSITIONING SYSTEMS

(71) Applicant: Apple Inc., Cupertino, CA (US)

(72) Inventors: Matin Seadat Beheshti, Sunnyvale, CA (US); Alexander B von Schulmann, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/464,172

(22) Filed: Sep. 8, 2023

(65) Prior Publication Data

US 2024/0385450 A1    Nov. 21, 2024

Related U.S. Application Data (60) Provisional application No. 63/502,592, filed on May 16, 2023.

(51) Int. Cl.
| | |
|---|---|
| *G02B 27/01* | (2006.01) |
| *G02B 7/02* | (2021.01) |
| *G02B 7/12* | (2021.01) |
| *G02B 27/00* | (2006.01) |

(52) U.S. Cl.
CPC ......... *G02B 27/0176* (2013.01); *G02B 7/022* (2013.01); *G02B 7/026* (2013.01); *G02B 7/12* (2013.01); *G02B 27/0093* (2013.01); *G02B 2027/0154* (2013.01)

(58) Field of Classification Search
CPC .. G02B 27/0176; G02B 27/017; G02B 27/01; G02B 7/022; G02B 7/026; G02B 7/12; G02B 27/0093; G02B 2027/0154
See application file for complete search history.

(56) References Cited

U.S. PATENT DOCUMENTS

| | | | |
|---|---|---|---|
| 11,036,054 B2 | 6/2021 | Poore et al. | |
| 11,064,188 B2 | 7/2021 | Lin et al. | |
| 11,126,004 B2 | 9/2021 | Franklin et al. | |
| 11,454,779 B1 | 9/2022 | Fang et al. | |
| 2002/0163486 A1* | 11/2002 | Ronzani | G02B 27/0176 345/87 |
| 2018/0217380 A1* | 8/2018 | Nishimaki | G02B 27/0176 |
| 2019/0041643 A1* | 2/2019 | Chang | H04N 13/398 |
| 2021/0278677 A1 | 9/2021 | Ouderkirk et al. | |
| 2021/0333506 A1* | 10/2021 | Maric | G02B 27/0176 |

* cited by examiner

*Primary Examiner* — Pegeman Karimi
(74) *Attorney, Agent, or Firm* — Treyz Law Group, P.C.; G. Victor Treyz; David K. Cole (57) ABSTRACT

A head-mounted device may include optical assemblies for presenting images to a user. Optical assembly positioning systems may be used to adjust the spacing between the optical assemblies to accommodate different interpupillary distances. The optical assembly positioning systems may have motors, shafts rotated by the motors, nuts that receive the shafts and that are moved as the shafts are rotated, and clutches that couple the nuts to the optical assemblies. The clutches may be spring-loaded clutches, magnetic clutches, electrically adjustable clutches, clutches that exhibit fixed clutch holding forces as a function of optical assembly position, and clutches that exhibit varying clutch holding forces as a function of optical assembly position. Electrically adjustable brakes may be used to help secure the optical assemblies in place.

19 Claims, 6 Drawing Sheets

ELECTRONIC DEVICES WITH OPTICAL ASSEMBLY POSITIONING SYSTEMS

This application claims the benefit of provisional patent application No. 63/502,592, filed May 16, 2023, which is hereby incorporated by reference herein in its entirety.

FIELD

This relates generally to electronic devices, and, more particularly, to electronic devices such as head-mounted devices.

BACKGROUND

Electronic devices have components such as displays and lenses. It can be challenging to customize such devices for different users.

SUMMARY

A head-mounted device may include optical assemblies for presenting images to a user. Optical assembly positioning systems may be used to adjust the spacing between the optical assemblies to accommodate different interpupillary distances.

Optical assembly positioning systems may have motors to move the optical assemblies. The position systems may have shafts rotated by the motors, nuts that receive the shafts and that are moved as the shafts are rotated, and clutches that couple the nuts to the optical assemblies.

The clutches may disengage when excess forces are generated on the optical assemblies during unexpected drop events or when the optical assemblies encounter resistance to their movement due to contact with nose surfaces. Positioning system clutches may include spring-loaded clutches, magnetic clutches, electrically adjustable clutches, clutches that exhibit fixed clutch holding forces as a function of optical assembly position, and clutches that exhibit variable clutch holding forces as a function of optical assembly position. If desired, electrically adjustable brakes may be used to help secure optical assemblies in place.

DETAILED DESCRIPTION

Electronic devices such as head-mounted devices may have displays for displaying images and lenses that are used in presenting the images to eye boxes for viewing by a user. Different users have different spacings between their eyes, which are sometimes referred to as interpupillary distances. To accommodate users with different interpupillary distances, a head-mounted device may be provided with movable optical assemblies.

Figure 1:
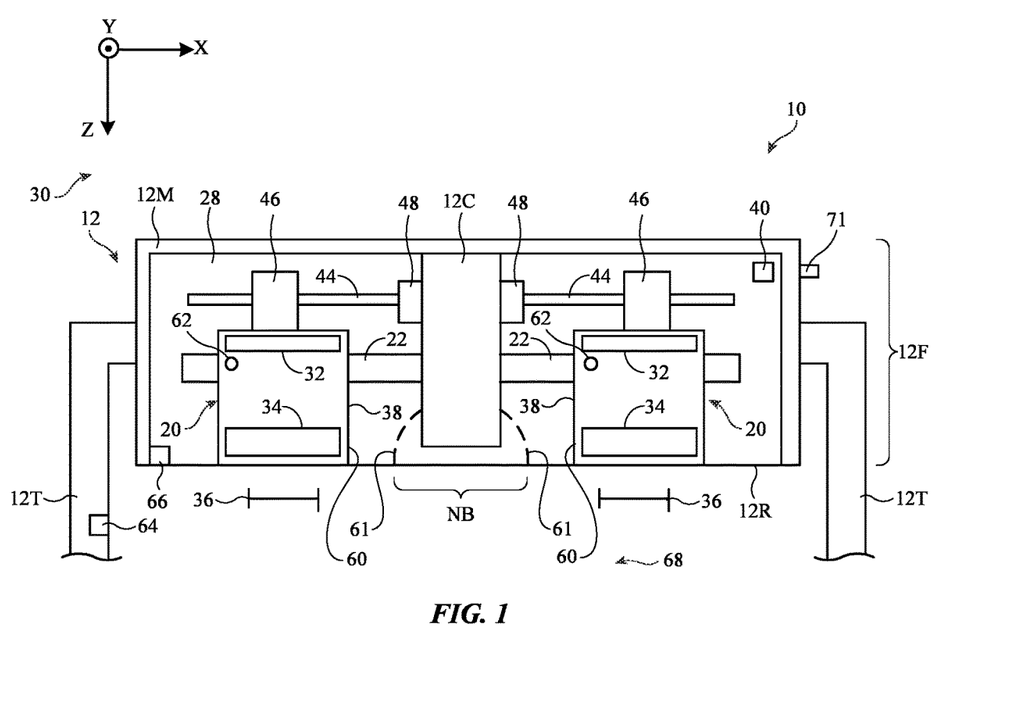
FIG. 1 is a diagram of an illustrative head-mounted device in accordance with an embodiment.

FIG. 1 is a schematic diagram of an illustrative electronic device of the type that may include movable optical assemblies to accommodate different interpupillary distances. Device 10 of FIG. 1 may be a head-mounted device (e.g., goggles, glasses, a helmet, and/or other head-mounted device). In an illustrative configuration, device 10 is a head-mounted device such as a pair of goggles (sometimes referred to as virtual reality goggles, mixed reality goggles, augmented reality glasses, etc.).

As shown in the illustrative cross-sectional top view of device 10 of FIG. 1, device 10 may have a housing such as housing 12 (sometimes referred to as a head-mounted support structure, head-mounted housing, or head-mounted support). Housing 12 may include a front portion such as front portion 12F and a rear portion such as rear portion 12R. When device 10 is worn on the head of a user, rear portion 12R rests against the face of the user and helps block stray light from reaching the eyes of the user and nose bridge portion NB of housing 12 rests on the nose of the user.

Main portion 12M of housing 12 may be attached to head strap 12T. Head strap 12T may be used to help mount main portion 12 on the head and face of a user. Main portion 12M may have a rigid shell formed from housing walls of polymer, glass, metal, and/or other materials. When housing 12 is being worn on the head of a user, the front of housing 12 may face outwardly away from the user, the rear of housing 12 (and rear portion 12R) may face towards the user. In this configuration, rear portion 12R may face the user's eyes located in eye boxes 36.

Device 10 may have electrical and optical components that are used in displaying images to eye boxes 36 when device 10 is being worn. These components may include left and right optical assemblies 20 (sometimes referred to as optical modules). Each optical assembly 20 may have an optical assembly support 38 (sometimes referred to as a lens barrel, optical module support, or support structure) and guide rails 22 along which optical assemblies 20 may slide to adjust optical-assembly-to-optical-assembly separation to accommodate different user interpupillary distances.

Each assembly 20 may have a display 32 that has an array of pixels for displaying images and a lens 34. Lens 34 may optionally have a removable vision correction lens for correcting user vision defects (e.g., refractive errors such as nearsightedness, farsightedness, and/or astigmatism). In each assembly 20, display 32 and lens 34 may be coupled to and supported by support 38. During operation, images displayed by displays 32 may be presented to eye boxes 36 through lenses 34 for viewing by the user.

Rear portion 12R may include flexible structures (e.g., a flexible polymer layer, a flexible fabric layer, etc.) so that portion 12R can stretch to accommodate movement of supports 38 toward and away from each other to accommodate different user interpupillary distances. These flexible portions may sometimes be referred to as a curtain, stretchable fabric curtain, etc.

The walls of housing 12 may separate interior region 28 within device 10 from exterior region 30 surrounding device 10. In interior region 28, optical assemblies 20 may be mounted on guide rails 22. Guide rails 22 may be attached to central housing portion 12C. If desired, the outer ends of guide rails 22 may be unsupported (e.g., the outer end portions of rails 22 may not directly contact housing 12, so that these ends float in interior region 28 with respect to housing 12).

Device 10 may include control circuitry and other components such as components 40. The control circuitry may include storage, processing circuitry formed from one or more microprocessors and/or other circuits. The control circuitry may be used to control any adjustable components in device 10 such as motors, actuators, displays, light-emitting components, audio components, etc. To support communications between device 10 and external equipment, the control circuitry may include wireless communications circuitry. Components 40 may include sensors such as force sensors (e.g., strain gauges, capacitive force sensors, resistive force sensors, etc.), audio sensors such as microphones, touch and/or proximity sensors such as capacitive sensors, optical sensors such as optical sensors that emit and detect light, ultrasonic sensors, and/or other touch sensors and/or proximity sensors, monochromatic and color ambient light sensors, image sensors, sensors for detecting position, orientation, and/or motion (e.g., accelerometers, magnetic sensors such as compass sensors, gyroscopes, and/or sensors such as inertial measurement units that contain some or all of these sensors), radio-frequency sensors, depth sensors (e.g., structured light sensors and/or depth sensors based on stereo imaging devices), optical sensors such as self-mixing sensors and light detection and ranging (lidar) sensors that gather time-of-flight measurements, humidity sensors, moisture sensors, visual inertial odometry sensors, current sensors, voltage sensors, and/or other sensors. In some arrangements, devices 10 may use sensors to gather user input (e.g., button press input, touch input, etc.). Sensors may also be used in gathering environmental motion (e.g., device motion measurements, temperature measurements, ambient light readings, etc.).

Optical assemblies 20 may have gaze trackers 62 (sometimes referred to as gaze tracker sensors). Gaze trackers 62, which may operate through lenses 34, may include one or more light sources such as infrared light-emitting diodes that emit infrared light to illuminate the eyes of a user in eye boxes 36. Gaze trackers 62 also include infrared cameras for capturing images of the user's eyes and measuring reflections (glints) of infrared light from each of the infrared light sources. By processing these eye images, gaze trackers 62 may track the user's eyes and determine the point-of-gaze of the user. Gaze trackers 62 may also measure the locations of the user's eyes (e.g., the user's eye relief and the user's interpupillary distance).

To accommodate users with different interpupillary distances (eye-to-eye spacings), the spacing between the left and right optical assemblies 20 in device 10 can be adjusted (e.g., to match or nearly match the user's measured interpupillary distance). Device 10 may have left and right actuators (e.g., motors) such as motors 48. Each motor 48, which may include internal gears, may be used to rotate an elongated threaded shaft (screw) such as shaft 44. A nut 46 is provided on each shaft 44. The nut has threads that engage the threads on that shaft 44. When a shaft is rotated, the nut on the shaft is driven in the +X or −X direction (in accordance with whether the shaft is being rotated clockwise or counterclockwise). In turn, this moves the optical assembly 20 that is attached to the nut in the +X or −X direction along its optical assembly guide rail 22. Each assembly 20 (e.g., support 38) may have portions that receive one of guide rails 22 so that the assembly is guided along the guide rail. By controlling the activity of motors 48, the spacing between the left and right optical assemblies of device 10 can be adjusted to accommodate the interpupillary distance of different users. For example, if a user has closely spaced eyes, assemblies 20 may be moved inwardly (towards each other and towards nose bridge portion NB of housing 12) and if a user has widely spaced eyes, assemblies 20 may be moved outwardly (away from each other).

When device 10 is being worn by a user, the user's head is located in region 68. The presence of the user's head (and therefore a determination of whether device 10 is being worn or is unworn) may be made using one or more sensors (e.g., gaze trackers 62, which may detect the presence of the eyes of the user in eye boxes 36, rear-facing sensors such as sensor 66 on main housing 12M, head-facing sensors mounted on strap 12T such as sensor 64, and/or other head presence sensors). These sensors may include cameras, light sensors (e.g., visible light or infrared sensors that measure when ambient light levels have dropped due to shadowing by the head of a user), proximity sensors (e.g., sensors that emit light such as infrared light and that measure corresponding reflected light from a user's head with an infrared light sensor, capacitive proximity sensors, ultrasonic acoustic proximity sensors, etc.), switches and/or other force-sensing sensors that detect head pressure when a user's head is present, and/or other head presence sensors.

Output from head presence sensors and/or output from gaze trackers 62 may be used in controlling motors 48 to automatically adjust the spacing of optical assemblies 20. Optical assembly spacing may also be adjusted manually (e.g., by controlling motors 48 using a button such as button 71).

When device 10 is being worn and a user's head is present in region 68, the nose of the user will be present under nose bridge portion NB of housing 12. When optical assemblies 20 are moved towards each other so that assemblies 20 are spaced apart by an amount that matches or nearly matches the user's interpupillary distance, inner side surfaces 60 of support structures 38 in assemblies 20 will move toward opposing outer side nose surfaces 61 of the user's nose. With sufficient inward movement of assemblies 20, surfaces 60 may contact and press against nose surfaces 61. As a result, an outward force on assemblies 20 is created by nose surfaces 61. To avoid discomfort that might arise if the user's nose is pressed against by more than a desired amount, device 10 may be provided with clutch features to limit inward nose pressure (e.g., to limit inward force by assemblies 20). For example, a clutch-based coupling system may be used to couple each motor 48 to its corresponding optical assembly 20.

With clutch-based coupling systems, clutches are used to limit the amount of inward force that is applied by optical assemblies 20 when assemblies 20 are moved towards nose surfaces 61 by motors 48. Clutches can also disengage when excessive forces are generated during drop events. Clutches may be based on permanent magnets, electromagnets, springs, electrically controlled electromagnetic components such as solenoids, friction pads, and/or other clutch mechanisms. The clutches may exhibit a fixed holding force or may use variable-force designs to alter the clutch holding force as a function of optical assembly position within device 10. The optical assembly positioning systems of device 10 may also be provided with electronically controlled brakes to help secure the optical assemblies after position adjustments have been made.

Figure 2:
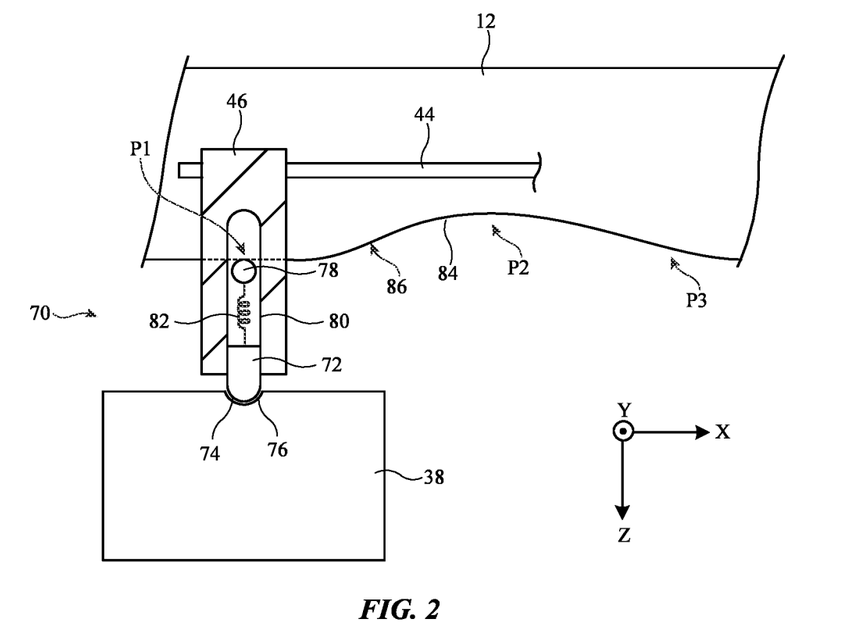
FIG. 2 is a diagram of an illustrative clutch with a profiled guide that generates a variable clutch holding force when coupling to an optical assembly in accordance with an embodiment.

In the example of FIG. 2, clutch 70 is a variable force clutch. Variable-force clutch 70 is being used to couple nut 46 to support 38 with a variable holding force. The variable holding force is generated by using a profiled guide to adjust the compression on a spring-loaded pin in the clutch as a function of optical assembly position along the X axis.

As shown in FIG. 2, clutch 70 may have an elongated slot or other opening such as opening 80 in which coupling pin 72 slides (e.g., pin 72 may move within opening 80 parallel to the Z axis in this example). Pin 72, spring 82, and ball 78 form a spring-loaded pin. Tip 74 of pin 72 is forced towards corresponding recess (notch) 76 of support 38 by spring 82. This releasably couples pin 72 to support 38, so that as nut 46 is moved in the +X or −X direction, pin 72 will, in turn, move support 38 in the +X or −X direction. The compression of spring 82 is controlled by the position of ball 78, which, in turn, is dictated by the shape of profiled guide 86.

In the event that more than a threshold amount of force is exerted between pin 72 and support 38 (e.g., due to a drop event on contact between surfaces 60 and 61 during optical assembly positioning operations), the holding force exerted by spring 82 will be momentarily overcome and pin 72 will be released from recess 76. As a result, support 38 will become decoupled from nut 46 and threaded shaft (leadscrew) 44. With this type of spring-loaded clutch arrangement, drop events and other unexpected events that lead to excessive force will cause clutch 70 to disengage, thereby helping to prevent damage (e.g., pin 72 will slide out of engagement with support 38, rather than imparting excessive force on support 38). Clutch 70 can also disengage when optical assemblies 20 are moved towards each other sufficiently to cause contact between surface 60 and nose surface 61.

As shown in FIG. 2, one end of spring 82 may be coupled to pin 72 and an opposing end of spring 82 may be coupled to ball 78. As the lateral position of structure 38 is adjusted, ball 78 rides along profiled guide 86, which may be formed from a non-planar surface in housing 12. Profiled guide 86 is characterized by profiled (curved) guide surface 84. At center portions of profiled guide 86, such as portion P2, ball 78 will move in the −Z direction to decompress spring 82 in the spring-loaded pin. This lowers the force exerted by pin 72 on recess 76 of structure 38 and thereby lowers the amount of holding force exhibited by clutch 70. At the end portions of guide 86, such as portions P1 (to the left in FIGS. 2) and P3 (to the right in FIG. 2), ball 78 will be forced in the +Z direction to increase the compression of the spring-loaded clutch pin. In particular, the movement of ball 78 will further compress spring 82 and thereby increasing the holding force of clutch 70 (e.g., by more forcefully pressing pin 72 into recess 76). As this example demonstrates, profiled guide 86 (e.g., a profiled guide formed from housing 12 and/or a guide structure rigidly coupled to housing 12) may be used to provide clutch 70 with a variable (lateral-position-dependent) coupling force.

With this arrangement for clutch 70, more clutch holding force is provided at the left and ends of the lateral travel of support 38 than at the center. The variable clutch force provided by clutch 70 of FIG. 2 may therefore help clutch 70 compensate for variable amounts of lateral force that may be imposed on structure 38 by rear portion 12R of housing 12. Rear portion 12R, which may sometimes be referred to as a flexible curtain, may, as an example, stretch to the left and right as structure 38 is moved to the left and right. When, for example, optical assemblies 20 are moved away from each other, rear portion 12R will stretch to accommodate this movement. This stretching creates an inward restoring force on structures 38 that may cause each structure 38 to drift inwardly from its intended position. Similarly, when optical assemblies 20 are moved towards each other, rear portion 12R may stretch in a way that tends to pull structures 38 outwardly away from each other.

Figure 3:
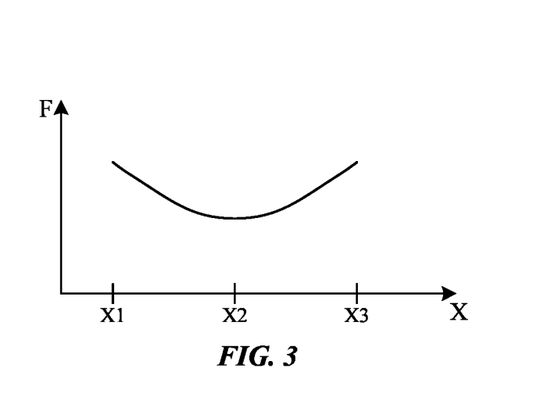
FIG. 3 is a graph showing how the amount of force exerted on an optical assembly due to stretching of housing materials around the optical assembly at the rear of a head-mounted device may vary as a function of optical assembly position within the head-mounted device in accordance with an embodiment.

FIG. 3 is a graph showing how the magnitude of the curtain restoring force F (which tends to cause drift in the position of assemblies 20) may be lowest when each structure 38 is at a central position along rail 22 (e.g., position X2, which may correspond to a position at which ball 78 of clutch 70 is at portion P2 of the profiled guide of FIG. 2) than when structures 38 have been moved outwardly or inwardly (see, e.g., end positions X1 and X3 of FIG. 3, which may corresponding to positions at which ball 78 is located at portions P1 and P3 of FIG. 2). Accordingly, the holding force of variable-force clutch 70 is larger when the potential drift-inducing force from stretched portion 12R is larger and the holding force of clutch 70 is smaller when the potential drift-inducing force from stretched portion 12R is smaller. Variable force clutch arrangements such as these that allow for higher clutch force at the extremes of the lateral travel of assemblies 20 compensate for variable curtain tension without using excessive holding force. This helps ensure that the clutch is not too stiff to release during drop events or events in which there is contact between surfaces 60 and nose surfaces 61.

Figure 4:
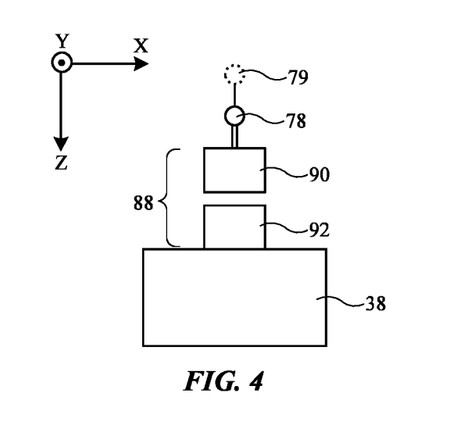
FIG. 4 is a diagram of an illustrative variable-force magnetic clutch for coupling an optical assembly to an actuator in accordance with an embodiment.

If desired, variable clutch coupling force for coupling nut 46 to structure 38 may be implemented using clutch based on a pair of variable-space magnets. This type of arrangement is shown in FIG. 4. As shown in FIG. 4, magnetic clutch 88 may have first magnet 90 and second magnet 92. Magnets 90 and 92 may be separated by gap W. Magnets 90 and 92 may have opposing polarity. The force with which magnet 90 and magnet 92 attract each other depends on the magnitude of gap W. When gap W is small, the clutch force exhibited by clutch 88 will tend to be large, because magnets 90 and 92 will attract each other strongly. When W is larger, the attractive force between magnets 90 and 92 will be reduced. Ball 78 may be captured and guided by a profiled guide such as profiled guide 86 of FIG. 2 as structure 38 and clutch 88 are moved parallel to the X axis. As ball 78 moves parallel to the Z axis, the position of ball 78 and therefore the position of magnet 90 is adjusted and thus the spacing between magnets 90 and 92 (and therefore the holding force of clutch 88 of FIG. 4) is adjusted. An electrically adjustable component (e.g., a solenoid coupled to ball 78 such as optional solenoid 79) may, if desired, be used to adjust the value of gap W in place of using a profiled guide to adjust the position of ball 78 and magnet 90. With this type of arrangement, clutch 88 will exhibit an electrically adjustable clutch force.

Figure 5:
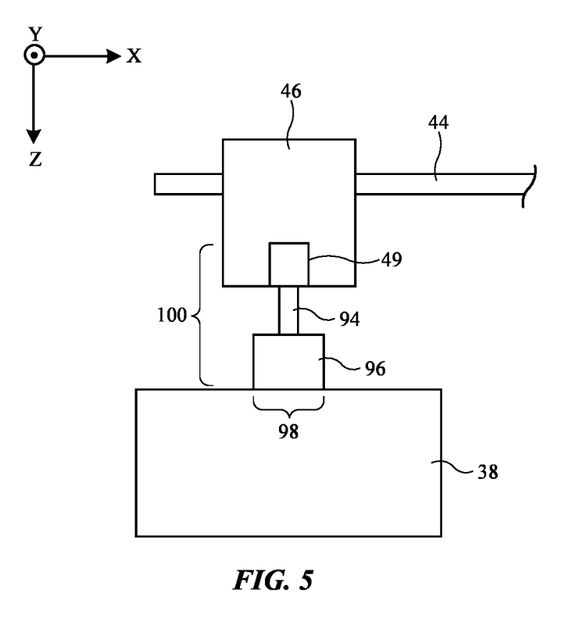
FIG. 5 is a cross-sectional side view of an illustrative friction clutch for coupling an optical assembly to an actuator in accordance with an embodiment.

If desired, clutches for device 10 may be based on friction pads. A friction clutch arrangement for coupling nut 46 to structure 38 is shown in FIG. 5. Friction clutch 100 may exhibit a fixed or variable holding force. For example, friction clutch 100 may exhibit a variable holding force that mirrors the curtain force F of FIG. 3 and thereby helps to prevent potential drift in the position of structure 38 when rear portion 12M of housing 12 is stretched, as described in connection with the graph of FIG. 3. Fixed holding force arrangements may also be used.

As shown in FIG. 5, friction clutch 100 may have a friction pad such as pad 96 coupled to a biasing device such as device 49. Device 49 may be a non-electrically-controllable (static) biasing device such as a spring, a foam pad, a pair of opposing magnets or other biasing device that pushes pad 96 against planar surface 98 of structure 38 with a fixed biasing force and therefore creates a fixed clutch holding force based on the static friction between pad 96 and structure 38. Alternatively, device 49 may be an electrically adjustable pad positioner such as a solenoid that pushes shaft 94 and therefore pad 96 against planar surface 98 of structure 38 with a force that is electronically controlled. In this type of variable-force clutch arrangement, the force with which device 49 presses pad 96 against structure 38 in direction Z determines that amount of friction between pad 96 and structure 38 and therefore the amount of clutch holding force exhibited by clutch 100.

During a drop event or other high-stress event, sufficient force will be generated to cause pad 96 to overcome its static friction with structure 38 (e.g., clutch 100 will release as pad 96 slips along the surface of structure 38 during a drop). Clutch 100 may also disengage in response to contact between surfaces 60 and nose surfaces 61. When device 49 is a solenoid or other electrically adjustable actuator that exhibits an electrically adjustable amount of force on pad 96, the amount of force on pad 96 and therefore the clutch holding force of clutch 100 may be selectively increased and decreased. For example, the holding force may be increased when device 49 and structure 38 are at end positions X1 and X3 relative to when device 49 and structure 38 are at center position X2, thereby compensating for increased drift-inducing force F at end positions X1 and X3 relative to position X2 that may arise due to the stretching of housing portion 12M as optical assemblies 20 are moved.

Figure 6:
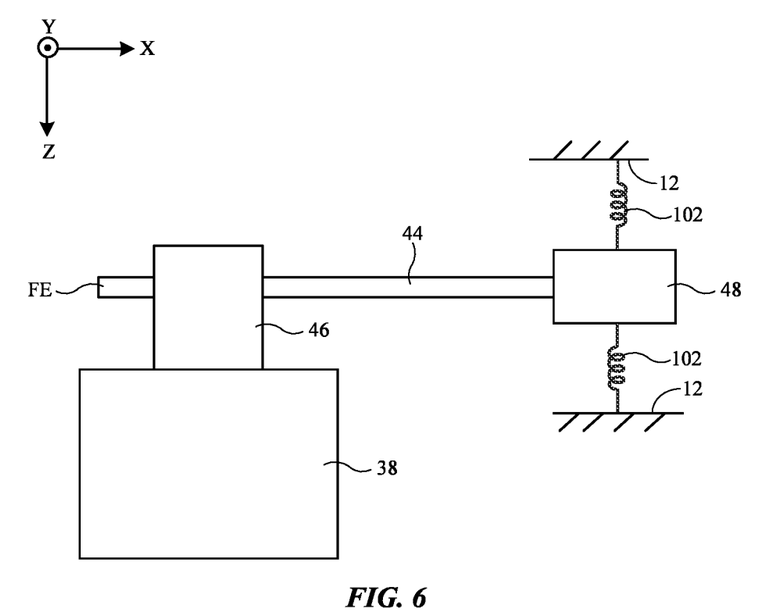
FIG. 6 is a cross-sectional side view of an illustrative arrangement for mounting an optical assembly positioning motor to a housing with flexible mounts in accordance with an embodiment.

FIG. 6 shows how motor 48 may be mounted using a flexible mounting structure (e.g., a flexible mount for motor 48 that is based on one or more flexible mounts 102). Flexible mounts 102 may be formed from springs, elastomeric pads, or other flexible structures that flex when device 10 is subjected to high stress during a drop event. This helps prevent damage to the positioning system formed by motor 48, threaded shaft 44, and nut 46.

Figure 7:
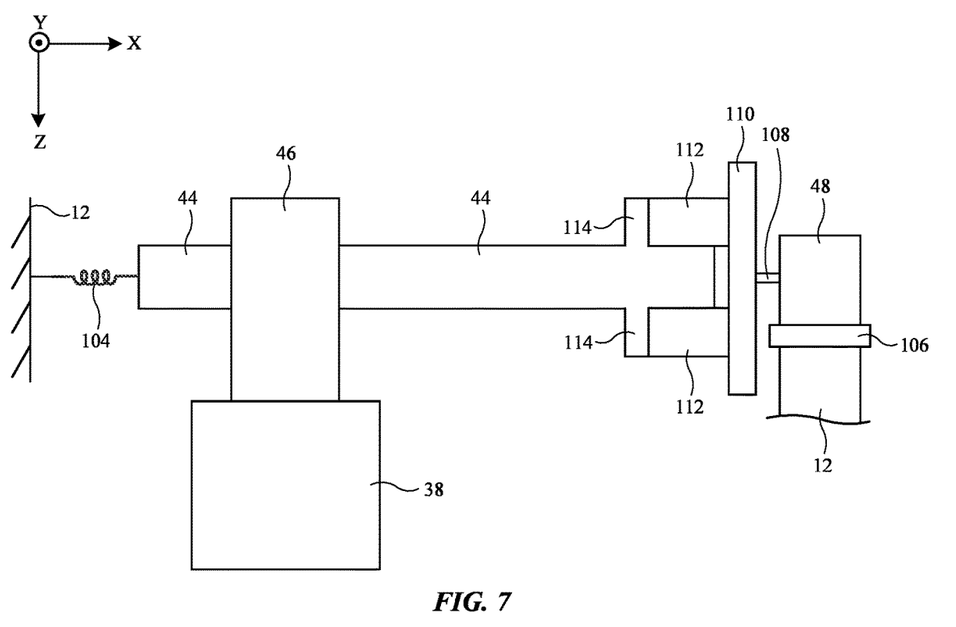
FIG. 7 is a cross-sectional side view of an illustrative compressible coupler arrangement that adds compliance to an optical assembly positioning system in accordance with an embodiment.

In the example of FIG. 6, far end FE of threaded shaft 44 is floating and is not coupled to housing 12. If desired, a flexible spring or other flexible support such as flexible mount 104 of FIG. 7 may be used to help support far end FE of threaded shaft 44. The example of FIG. 7 also shows how an elastomeric pad, spring, or other flexible mounting member such as flexible mount 106 may be used to mount motor 48 to housing 12. As with the illustrative motor mounting arrangement of FIG. 6, this mounting arrangement allows motor 48 to move slightly in the event of high stress due to a drop event, thereby helping to prevent damage to the optical assembly positioning system. As shown in FIG. 7, motor 48 may rotate shaft 108, which may, in turn, rotate pad 110. Compressible coupler 112 (e.g., an elastomeric washer) may be axially compressed between pad 110 and protruding portion (flange) 114 of shaft coupler 110. In this way, motor 48 is frictionally engaged with shaft 44 and can rotate shaft 44. In the event that device 10 is dropped, coupler 112 may flex (and spring 104 may flex), thereby further relieving stress and helping to avoid damage.

Figure 8:
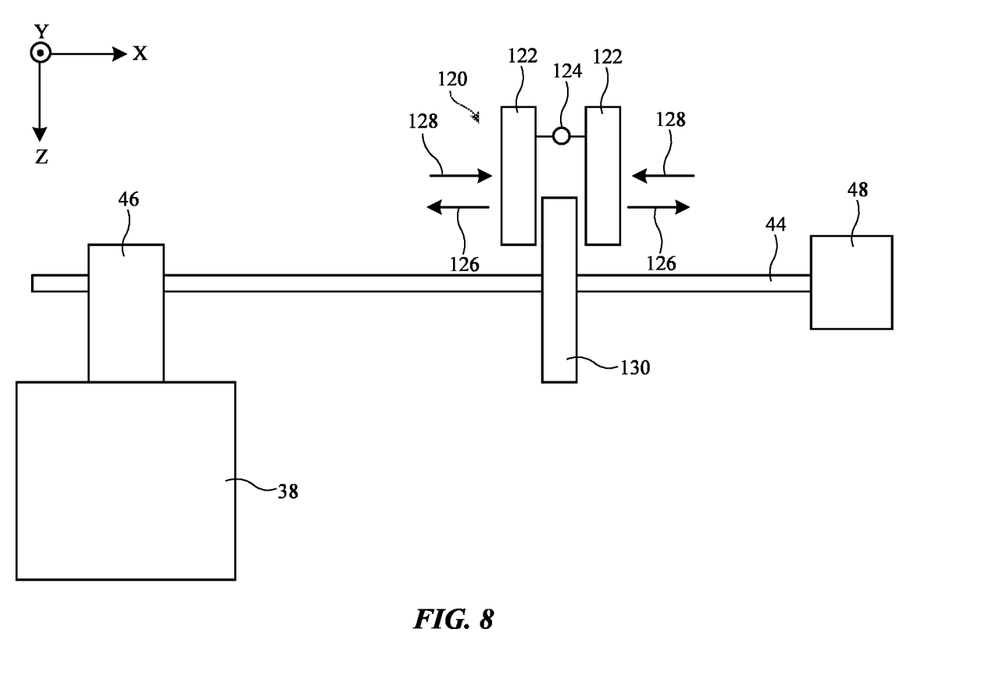
FIG. 8 is a cross-sectional side view of an illustrative optical assembly positioning system with a brake to help prevent back driving of a leadscrew in accordance with an embodiment.

To prevent drift in the positions of optical assemblies 20, it is desirable to prevent back-driving of threaded shaft 44 by nut 46 when structure 38 is subjected to lateral force from a stretched portion of housing portion 12M. To enhance driving efficiency, threaded shaft 44 may have a relatively coarse thread. This may lead to an enhanced risk of back-driving shaft 44 by nut 46. To help prevent back-driving in this situation, the optical assembly positioning systems of device 10 may be provided with electrically controlled brakes. As shown in FIG. 8, for example, electrically controlled brake 120 may have first and second opposing brake pads 122. Disk 130 may be mounted to threaded shaft 44 and may protrude between pads 122. Electrically controlled actuator 124 may be used to move pads 122 away from each other in directions 126 (thereby releasing disk 130 and allowing shaft 44 to be rotated freely by motor 48 so that nut 46 can adjust the position of support 38) and may be used to move pads 122 towards each other in directions 128 (thereby gripping disk 130 and preventing undesired back-driving and rotation of shaft 44). As this example demonstrates, brake 120 may be released when motor 48 is moving support 38 and may be used to help lock the position of support 38 in place after support 38 has been moved to a desired position. If desired, the surfaces of brake pads 122 and/or the opposing surfaces of disk 130 may be textured (e.g., these surfaces may be knurled). The texture may be tuned to provide sufficient braking friction between pads 122 and disk 130 during normal braking operation, while slipping (and thereby serving as a releasable friction clutch) in the event that device 10 is dropped or otherwise subjected to unexpected excess force (or when there is force on structures 38 due to contact between surfaces 60 and nose surfaces 61).

To help protect the privacy of users, any personal user information that is gathered by device 10 may be handled using best practices. These best practices including meeting or exceeding any privacy regulations that are applicable. Opt-in and opt-out options and/or other options may be provided that allow users to control usage of their personal data.

The foregoing is merely illustrative and various modifications can be made to the described embodiments. The foregoing embodiments may be implemented individually or in any combination.

What is claimed is:

1. A head-mounted device, comprising:
    a head-mounted housing;
    optical assemblies in the head-mounted housing that are configured to move towards and away from a nose bridge portion of the head-mounted housing, each optical assembly including a lens and a display configured to provide an image to an eye box through the lens;
    nuts coupled to the optical assemblies;
    threaded shafts received in the nuts;
    motors configured to rotate the threaded shafts to move the nuts and the optical assemblies that are coupled to the nuts; and
    spring-loaded pins that releasably couple the nuts to the optical assemblies.

2. The head-mounted device defined in claim 1 further comprising profiled guides that provide variable amounts of spring compression to the spring-loaded pins as the nuts are moved relative to the nose bridge portion.

3. The head-mounted device defined in claim 2 wherein the optical assemblies have recesses configured to receive the spring-loaded pins and wherein the profiled guides are formed from curved surfaces in the head-mounted housing.

4. A head-mounted device, comprising:

a head-mounted housing;

optical assemblies in the head-mounted housing that are configured to move towards and away from a nose bridge portion of the head-mounted housing, each optical assembly including a lens and a display configured to provide an image to an eye box through the lens;

nuts;

threaded shafts received in the nuts;

magnetic clutches each of which releasably couples a respective one of the nuts to a respective one of the optical assemblies; and motors configured to rotate the threaded shafts to move the nuts and the optical assemblies that are coupled to the nuts.

5. The head-mounted device defined in claim 4 wherein each magnetic clutch comprises first and second magnets separated by a gap.

6. The head-mounted device defined in claim 5 further comprising profiled guides each of which is configured to move the first magnet in a respective one of the magnetic clutches to change a size of the gap in that magnetic clutch as the nut coupled to that magnetic clutch is moved relative to the nose bridge portion.

7. A head-mounted device, comprising:

a head-mounted housing;

optical assemblies in the head-mounted housing that are configured to move towards and away from a nose bridge portion of the head-mounted housing, each optical assembly including a lens and a display configured to provide an image to an eye box through the lens;

friction clutches, each comprising a friction pad configured to press against a respective one of the optical assemblies;

nuts coupled to the optical assemblies by the friction clutches;

threaded shafts received in the nuts; and motors configured to rotate the threaded shafts to move the nuts and the optical assemblies that are coupled to the nuts.

8. The head-mounted device defined in claim 7 wherein each friction clutch comprises a spring configured to bias the friction pad of that friction clutch towards a respective one of the optical assemblies.

9. The head-mounted device defined in claim 7 wherein each friction clutch comprises an electrically adjustable solenoid configured to bias a respective one of the friction pads towards a respective one of the optical assemblies.

10. A head-mounted device, comprising:

a head-mounted housing;

optical assemblies in the head-mounted housing that are configured to move towards and away from a nose bridge portion of the head-mounted housing, each optical assembly including a lens and a display configured to provide an image to an eye box through the lens;

nuts coupled to the optical assemblies;

threaded shafts received in the nuts;

motors configured to rotate the threaded shafts to move the nuts and the optical assemblies that are coupled to the nuts; and flexible mounts each of which is configured to mount a respective one of the motors to the head-mounted housing.

11. The head-mounted device defined in claim 10 wherein the flexible mounts comprise springs.

12. The head-mounted device defined in claim 10 wherein the flexible mounts comprise elastomeric mounts.

13. The head-mounted device defined in claim 10 further comprising:

rotatable pads each of which is configured to be rotated by a respective one of the motors; and compressible couplers each of which is compressed between a respective one of the rotatable pads and a portion of a respective one of the threaded shafts to frictionally couple that rotatable pad to that threaded shaft.

14. The head-mounted device defined in claim 13 further comprising flexible supports each of which is coupled between the head-mounted housing and an end portion of a respective one of the threaded shafts.

15. A head-mounted device, comprising:

a head-mounted housing;

optical assemblies in the head-mounted housing that are configured to move towards and away from a nose bridge portion of the head-mounted housing, each optical assembly including a lens and a display configured to provide an image to an eye box through the lens;

nuts coupled to the optical assemblies;

threaded shafts received in the nuts;

motors configured to rotate the threaded shafts to move the nuts and the optical assemblies that are coupled to the nuts; and electrically adjustable brakes each configured to control rotation of a respective one of the threaded shafts.

16. The head-mounted device defined in claim 15 wherein each electrically adjustable brake comprises:

an actuator; and at least one brake pad configured to be moved by the actuator.

17. The head-mounted device defined in claim 16 further comprising disks each of which is mounted to a respective one of the threaded shafts.

18. The head-mounted device defined in claim 17 wherein each actuator is configured to move a respective one of the brake pads towards and away from a respective one of the disks.

19. The head-mounted device defined in claim 18 wherein the actuators are configured to move the brake pads away from the disks while the threaded shafts are being rotated by the motors to move the optical assemblies.

* * * * *